United States Patent
Gullotta

(10) Patent No.: US 9,630,272 B2
(45) Date of Patent: Apr. 25, 2017

(54) IDENTIFYING PLASMA ARC TORCH COMPONENTS AND RELATED SYSTEMS AND METHODS

(71) Applicant: Hypertherm, Inc., Hanover, NH (US)

(72) Inventor: Justin Gullotta, Brownsville, VT (US)

(73) Assignee: Hypertherm, Inc., Hanover, NH (US)

( * ) Notice: Subject to any disclaimer, the term of this patent is extended or adjusted under 35 U.S.C. 154(b) by 276 days.

(21) Appl. No.: 14/289,200

(22) Filed: May 28, 2014

(65) Prior Publication Data

US 2015/0343555 A1 Dec. 3, 2015

(51) Int. Cl.
*B23K 10/00* (2006.01)
*H05H 1/34* (2006.01)

(52) U.S. Cl.
CPC .............. *B23K 10/006* (2013.01); *H05H 1/34* (2013.01); *H05H 2001/3494* (2013.01)

(58) Field of Classification Search
CPC ........ B23K 10/006; B23K 9/10; B23K 9/973; H05H 1/34; H05H 1/36; H05H 2001/3439; H05H 2201/3478
USPC ...... 219/121.54, 121.57, 75, 121.39, 121.45, 219/121.59, 121.44, 121.46, 121.48; 313/231.41, 231.51
See application file for complete search history.

(56) References Cited

U.S. PATENT DOCUMENTS

| | | | | |
|---|---|---|---|---|
| 5,624,586 A * | 4/1997 | Sobr | ....................... | H05H 1/34 219/121.48 |
| 5,717,187 A * | 2/1998 | Rogozinski | .............. | H05H 1/36 219/121.51 |
| 9,193,004 B2 * | 11/2015 | Enyedy | .................. | B23K 9/095 |
| 9,266,184 B2 * | 2/2016 | Hemmert | ............... | B23K 9/125 |
| 2006/0196862 A1 * | 9/2006 | Sickels | ..................... | B23K 9/12 219/130.5 |
| 2009/0008370 A1 | 1/2009 | Salsich et al. | | |
| 2011/0114616 A1 * | 5/2011 | Albrecht | ................ | B23K 9/095 219/137 R |
| 2012/0234803 A1 * | 9/2012 | Liu | ...................... | B23K 10/006 219/121.54 |
| 2014/0061170 A1 * | 3/2014 | Lindsay | ................. | B23K 26/60 219/121.54 |

\* cited by examiner

*Primary Examiner* — Mark Paschall
(74) *Attorney, Agent, or Firm* — Proskauer Rose LLP

(57) ABSTRACT

In some aspects, methods for operating a plasma cutting system can include initiating an arc between a set of consumable components disposed in a torch of the plasma cutting system, the set of consumable components including a first consumable component and a second consumable component, detecting an operational characteristic of the arc, and analyzing the operational characteristic to identify at least one consumable component of the set of consumable components.

19 Claims, 2 Drawing Sheets

IDENTIFYING PLASMA ARC TORCH COMPONENTS AND RELATED SYSTEMS AND METHODS

TECHNICAL FIELD

This disclosure relates generally to thermal cutting torches (e.g., plasma arc torches), and more specifically to identifying plasma arc torch components and related systems and methods.

BACKGROUND

Material processing systems, such as thermal processing torches (e.g., plasma arc torches), are used in the heating, cutting, gouging, and marking of materials. Typically, a plasma arc torch includes multiple replaceable consumable components, which can include an electrode mounted within a torch body, a swirl ring, a nozzle, one or more retaining caps, and a shield. The nozzle typically has an exit orifice, electrical connections, passages for cooling, and passages for arc control fluids (e.g., plasma gas). Optionally, the swirl ring can be used to control fluid flow patterns in the plasma chamber formed between the electrode and the nozzle. In some torches, a retaining cap can be used to position the nozzle and/or swirl ring in the plasma arc torch.

In operation, the torch produces a plasma arc, which is a constricted jet of an ionized gas with high temperature and sufficient momentum to assist with removal of molten metal. Each consumable can be selected to achieve optimal performance (e.g., an optimal current level, maximum lifespan, etc.) in view of specific processing constraints, such as the type of material being cut and/or the cut shape desired. Installing incorrect consumables into a torch can result in poor cut quality and decreased cut speed. In addition, incorrect consumables (e.g., not in accordance with the selected system parameters) can reduce consumable life and lead to premature consumable failure.

SUMMARY

In some aspects, methods for operating a plasma cutting system can include initiating an arc between a set of consumable components disposed in a torch of the plasma cutting system, the set of consumable components including a first consumable component and a second consumable component; detecting an operational characteristic of the arc; and analyzing the operational characteristic to identify at least one consumable component of the set of consumable components.

Embodiments described herein can include one or more of the following features.

In some embodiments, the method can also include adjusting at least one operating parameter for the plasma cutting system based on the identified consumable component. The adjusting at least one operating parameter can include limiting a cutting current of the plasma cutting system to a predetermined value. In some non-limiting examples, the predetermined value can be about 20 Amps. In some embodiments, the limiting the cutting current can be in response to measuring a voltage value of the arc as being greater than about 132 Volts. In some embodiments, the arc can be a pilot arc. In some embodiments, the operational characteristic can include a voltage of the arc. In some embodiments, the set of consumable components can include at least one of a nozzle or an electrode. In some embodiments, the identifying the at least one consumable component can include comparing a measured voltage of the arc to a threshold value. In some embodiments, the method further includes adjusting an operating parameter of the plasma cutting system based on whether the measured voltage is greater than or less than the threshold value. In some embodiments, the initiating of the arc can be responsive to at least one of generating a torch start signal or activating a trigger device disposed on the torch body. In some embodiments, the method also includes displaying an identifier associated with the at least one consumable identified.

In some aspects, plasma cutting systems can include a torch including a torch body and a set of consumable components connected to the torch body and configured to generate a plasma arc; and a power supply operably connected to the torch, the power supply including a controller configured to monitor an arc initiated between two consumable components of the set of consumable components, the controller comparing a characteristic of the arc to a predetermined set of characteristics and identifying at least one consumable component in the set of consumable components.

Embodiments described herein can include one or more of the following features. In some embodiments, the arc can be a pilot arc. In some embodiments, the set of consumable components can include at least one of a nozzle or an electrode. In some embodiments, the controller can be configured to adjust an operational parameter of the torch. In some embodiments, the system can also include a display device in communication with the power supply, the display device being configured to output a visual indicator associated with the identified consumable components.

In some aspects, consumable detection systems for identifying a consumable component of a set of consumable components connected to a plasma cutting system can include a monitoring module to monitor an operational characteristic of an arc generated between at least two consumable components of the set of consumable components disposed within the plasma cutting system; and a control module to analyze the operational characteristic to identify at least one consumable component of the set of consumable components.

Embodiments described herein can include one or more of the following features. In some embodiments, systems can include a device to adjust one or more operating parameters for the plasma cutting system based on the identified consumable component. In some embodiments, the operational characteristic can be a voltage of the arc.

Embodiments described herein can have one or more of the following advantages.

In some aspects, the consumable detection systems and methods described herein can be used to identify consumables in a less expensive or more simple manner than with some other consumable identification systems. For example, in some cases, by utilizing features of the consumables (e.g., properties of plasma arc generation using the consumable) rather than implementing complex systems or devices to identify consumables, some conventional plasma arc systems may be used to identify consumables without requiring significant costly modifications. Additionally, by determining the consumables at startup, in some embodiments, the plasma arc system can be semi-automatically (e.g., automatically) configured for use with the identified consumable.

DETAILED DESCRIPTION

In some aspects, plasma arc torch systems can be configured to determine a type of consumable component that is installed in a torch of the system by monitoring and detecting an operational characteristic (e.g., voltage) of an arc, such as a pilot arc, initiated between two consumable components installed in the torch.

Figure 1:
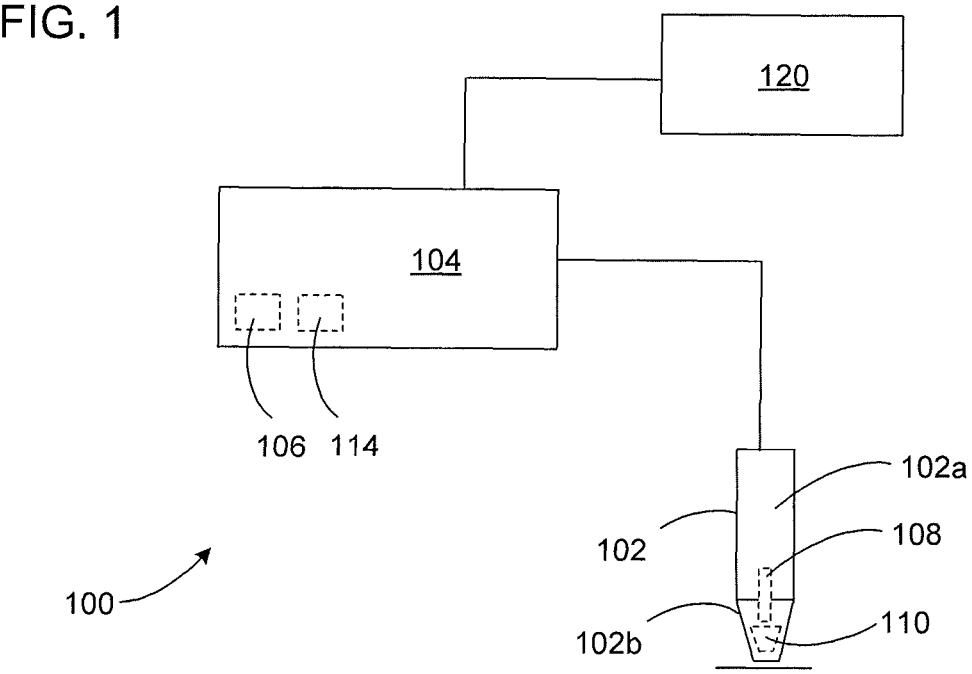
FIG. 1 is a schematic illustration of an example plasma arc torch system having a control device configured to monitor an arc initiated between a set of consumable components installed in a torch device and identify at least one of the consumable components based on the monitored arc.

Referring to FIG. 1, a material processing system (e.g., a plasma arc torch system, plasma torch system, or plasma cutting system) 100 generally includes a processing device, such as a torch device (e.g., a handheld torch or a mechanized or automated torch) 102 that is operably connected to a material processing system power supply 104 to receive electrical power and gas (e.g., pilot gas or cutting gas) for operation.

The torch 102 typically includes a torch body 102a and a torch tip 102b. The torch tip 102b typically includes one or more consumables (e.g., replaceable consumable components (e.g., an electrode 108 and a nozzle 110)) disposed within a receptacle configured to receive a consumable. Each of the various consumables can include a body that defines various features that, as discussed herein, can direct fluids (e.g., gas or liquids) during operation of the torch 100. The torch body 102a, which has a generally cylindrical shape, supports the electrode 108 and the nozzle 110. The nozzle 110 is typically spaced from the electrode 108 within the torch body 102a and has a central exit orifice through which plasma gas can pass. In some cases, a shield can be disposed over the nozzle to protect internal consumables from spattering workpiece material (e.g., molten metal). Additionally, one or more retaining caps can be used along the torch tip to secure any of the various consumables in place. The torch 102 can additionally include electrical connections, passages for cooling, passages for arc control fluids (e.g., plasma gas), and a power supply. In some examples, the plasma arc torch system includes an air-cooled torch.

Figure 2:
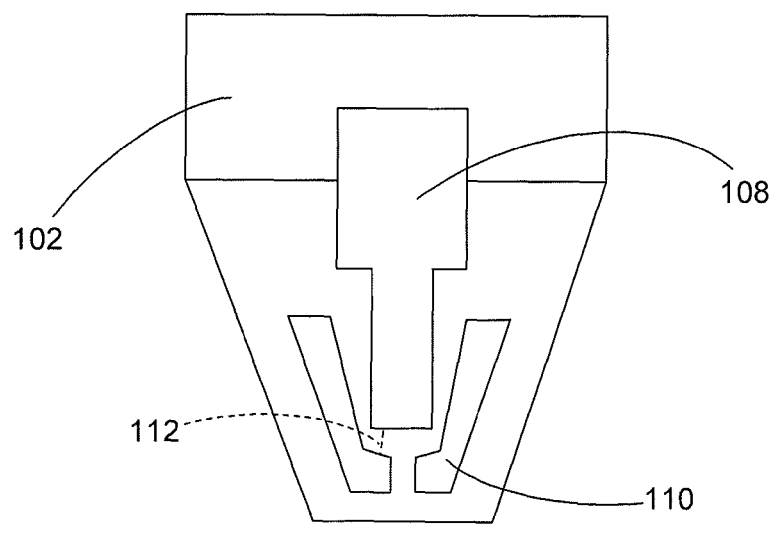
FIG. 2 is an enlarged schematic illustration of the torch device of FIG. 1 depicting an arc initiated between the set of consumable components, which can be used to identify at least one of the consumable components.

During use, the torch 102 can generate a cutting beam or arc (e.g., a plasma arc), which can be initiated between the electrode 108 and the nozzle 110, for processing a workpiece (e.g., a metal plate-like workpiece). Briefly referring to FIG. 2, a pilot arc 112 can be initially generated between the electrode 108 and the nozzle 110 to create the plasma arc. In some examples, during use, the plasma arc may be transferred from the nozzle 110 to a workpiece so that the cutting arc is conducted between the electrode 108 and the workpiece.

Referring back to FIG. 1, the power supply 104 includes a control unit module (e.g., a microprocessor) 106 that is configured to control the operation of the power supply 104 and the torch 102 during use. In some cases, the control unit 106 can be a module device to analyze various aspects of the operations of the torch system 100. Additionally or alternatively, the control unit 106 can be configured to adjust operating parameters of the torch system 100. The control unit 106 is also configured to communicate with other components (e.g., modules) of the torch system 100, which can be part of the power supply 104. For example, the power supply 104 can also include an operational monitoring module 114 that can be in communication with the control unit 106 and the torch 102. It is noted that in some embodiments, the control unit 106 and the operational monitoring module 114 can be formed as separate modules or components in communication with one another or one or more components having multiple functionalities of one or more of these modules. Module 114 may be an additional hardware component or software component in the system.

The operational monitoring module 114 can monitor operational characteristics of the torch during start-up and/or during a cutting operation. For example, the operational monitoring module 114 can monitor an operational characteristic of an arc between at least two consumables installed in the torch, such as the electrode 108 and the nozzle 110. As discussed below, the control unit 106 is typically configured to analyze the operational characteristic to identify one or more consumables based on the monitored operational characteristic as determined by the operational monitoring module 114.

In some embodiments, the operational monitoring module 114 can monitor operational characteristics of the torch during a start-up operation so that it can detect (or predict) consumable components installed in the torch to semi-automatically (e.g., automatically) set-up the plasma cutting system for a processing operation. In some cases, the operational monitoring module 114 can detect an aspect of the pilot arc 112, such as a voltage, which can be indicative of the consumables (e.g., the nozzle 110) installed in the torch. That is, different types (e.g., differently sized, differently shaped, etc.) of consumable components can cause different pilot arc voltages to be generated and by detecting the differences in pilot arc voltages, a plasma cutting system can be automatically configured to operate with the detected types of consumables.

In some embodiments, the torch system can include (or otherwise be in communication with) a display device on which an identifier can be displayed to describe or indicate a type of detected consumable(s). In some cases, the display device can include a simple light (e.g., an LED) that lights up to denote than a certain type of consumable is installed. Alternatively or additionally, the display device can include a monitor (e.g., a computer monitor) or other type of screen to present information.

In some embodiments, a torch system can be configured to operate with a series of different consumable components (e.g., nozzles). As discussed below, during start-up when the pilot arc 112 is initiated between the electrode and the nozzle, the operational monitoring module 114 can detect the voltage of the pilot arc 112 and communicate the voltage to the control unit 106. The detected pilot arc voltage can be compared to one or more threshold voltages to predict (e.g., determine) the type of consumable(s) installed in the torch.

Based on the determined consumable (e.g., nozzle), the control unit 106 can be configured to manipulate (e.g., change, alter, adjust) an operational parameter of the torch system for use with that particular consumable. For example, the control unit 106 can adjust cutting parameters, such as arc (e.g., cutting arc) voltage, current, gas pressure, and/or operation mode settings, such as tuning for particular cutting scenarios (e.g., gouging, fine cutting, or high speed cutting).

In some embodiments, a series of nozzles can each be configured to operate at different power ratings and can have a different size or construction that produces different pilot arc voltages. For example, in some cases a torch can be configured to operate with two different types of nozzles including a high power nozzle and a low power nozzle. The two different types of nozzles can cause different pilot arc voltages during start-up, for example, as a result of different nozzle shapes and/or material masses used to form the nozzles. In some cases, one of the nozzles (e.g., the high power nozzle) can have a longer nozzle bore length, thereby creating a higher pilot arc voltage than that of the low power nozzle (with a shorter bore length) having a lower pilot arc voltage than the high power nozzle. Therefore, the control unit 106 can compare the measured pilot arc voltage to a threshold pilot arc voltage value and determine if it indicates that the nozzle is a high power nozzle. If the detected pilot arc voltage exceeds the threshold value, the control unit can configure the plasma arc torch system to operate with the high power nozzle. Alternatively, if the detected pilot arc voltage is less than the threshold value, the control unit can determine that a lower power nozzle is installed in the torch and can configure the plasma arc torch system accordingly.

In some embodiments, similar system configuration systems can be used to distinguish between other types of nozzles, such as a gouging nozzle and a cutting nozzle. That is, when a plasma cutting system is configured for a particular processing mode (e.g., cutting mode or gouging mode), the pilot arc voltage generated during startup can vary when different types of consumables are installed in the torch (e.g., gouging consumables vs. cutting consumables). For example, Table 1 below illustrates various parameters that can occur during several different startup situations.

TABLE 1

|  | System Mode | System Pressure (psi) | Pilot Current (A) | Arc Voltage with Gouging Consumables (V) | Arc Voltage with Cutting Consumables (V) | Difference (V) |
|---|---|---|---|---|---|---|
| Example 1 | Cut | 75 | 26 | 151 | 200 | ~50 |
| Example 2 | Gouge | 50 | 32 | 142 | 172 | ~30 |

As detailed above in Table 1, the pilot arc voltage generated using different types of consumables (e.g., gouging consumables vs. cutting consumables) can be noticeably (e.g., detectably or significantly) different and can serve as a way to determine what types of consumables are installed in the torch. By way of a non-limiting example, as described in Table 1, if an example cutting system is configured to cut (i.e., rather than gouge), the expected pilot arc voltage to be generated using cutting consumables can be about 200 V, whereas an expected pilot arc voltage to be generated using gouging consumables can be less (e.g., about 151 V). Therefore, if the cutting system detects a pilot arc voltage that is low enough to suggest that gouging consumables are incorrectly installed in the torch (e.g., the voltage is less than a threshold value between the 151 V and the 200 V), it can determine that the incorrect consumables are installed in the torch. As described herein, the cutting system can also alert the user accordingly. In some embodiments, the cutting system could automatically reconfigure for use with the installed consumables (e.g., to change to gouging mode). As detailed in Table 1, there are similar differences in pilot arc voltage when the cutting system is configured in a gouging mode and different types of consumables are installed in the torch (e.g., gouging consumables vs. cutting consumables). While certain numerical values are described in Table 1, it is noted that these are merely examples for one type of cutting system and the specific values can vary from system to system without departing from the concepts described herein.

In some embodiments, the detection and configuration can occur quickly when the torch system first starts up. For example, the detection and configuration can be performed within a few milliseconds of a user pulling a trigger on a handheld torch to initiate an arc.

Additionally or alternatively, the systems and methods described herein can be used to protect system components by reducing or limiting cutting current. For example, a power supply (e.g., the power supply 104) may be configured to be connected to a power source that provides an input voltage that can be either 110V or 220V. When the input voltage is low (e.g., 110V), the input current will typically be large (e.g., relative to the input current for a 220V input voltage) to produce the required full cutting power output. In some situations this may be detrimental or harmful to the power supply or may limit system performance as the large input current necessary to sustain full cutting power can damage system components during prolonged use. Normal consumables (i.e., non fine-cut consumables) usually cut at a higher arc voltage and therefore typically draw more current from the input source. If fine-cut consumables are used, the arc voltage is typically smaller than that for the normal consumables, therefore drawing less power from the line. Therefore, upon recognizing that normal consumables are connected, the power supply may check the input power (e.g., to determine if the input voltage is 110V or 220V) and determine that although normal consumables (i.e., non fine-cut consumables) are connected, low voltage is provided to the torch and the cutting current may be limited to reduce the likelihood of system damage. This could potentially override operators that may attempt to max out the system cutting current even though the system is powered by a low voltage line.

The torch systems described above including consumable detection systems can be used in various ways to execute any of a variety of different torch configuration methods.

Figure 3:
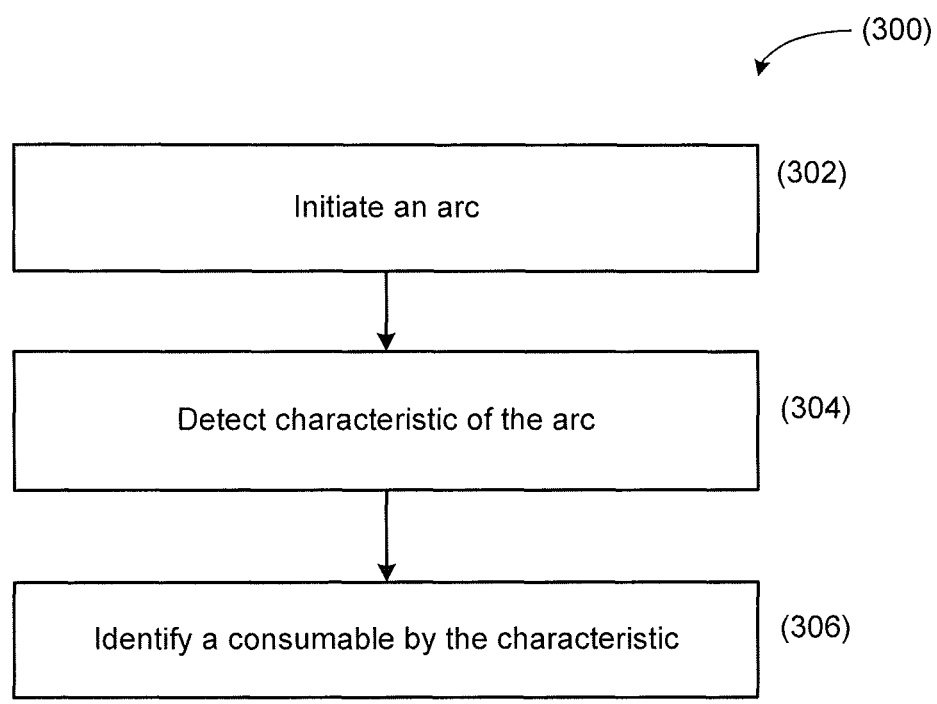
FIG. 3 is a flow chart depicting a method for identifying one or more consumable components installed in a plasma torch device.

Referring to FIG. 3, in some example methods for operating a plasma cutting system (300), an arc is first initiated. (302) For example, an arc (e.g., a pilot arc) can be initiated between a set of consumable components disposed in a torch of the plasma cutting system. In some cases, the set of consumable components includes a first consumable component (e.g., an electrode) and a second consumable component (e.g., a nozzle). In some embodiments, the set of consumables includes at least one of the nozzle or the electrode. In some examples, the arc can be initiated in response to at least one of generating a torch start signal (e.g., using a mechanized torch) or activating a trigger device (e.g., using switch on a handheld torch) disposed on the torch body.

A characteristic (e.g., an operational characteristic) of the arc can then be detected. (304) For example, a component of the plasma arc torch system (e.g., the operational monitoring module 114) can detect the operational characteristic of the arc. In some cases, the operational monitoring module 114 can detect a voltage of the pilot arc.

The operational characteristic can be analyzed to identify at least one consumable component of the set of consumable components. (306) For example, in some embodiments, identifying the consumable component can include comparing (e.g., using the control unit 106) the detected operational characteristic of the arc (e.g., a measured voltage of the pilot arc) to a threshold value. In some cases, the identifying the consumable component includes comparing a measured pilot arc voltage to a threshold voltage. As mentioned above, the pilot arc voltage can be related to a length of a nozzle, and therefore, in some cases, the identifying the consumable can also include determining a bore length of a plasma nozzle to determine the type of the nozzle.

In some embodiments, the method can include also adjusting at least one operating parameter for the plasma arc torch system based on the identified consumable component. For example, the operating parameter can be adjusted based on whether the measured voltage is greater than or less than the threshold value. As discussed above, the operating parameters can include cutting current, gas pressure, and/or system cutting mode settings directed to different types of processing, such as gouging, fine cutting, or high speed cutting.

In some embodiments, the adjusting an operating parameter includes limiting a cutting current of the plasma cutting system to a predetermined, limited (e.g., maximum-limit) operating value. For example, the predetermined operating current value can be about 15 Amps to about 25 Amps (e.g., about 20 Amps). In some cases, the cutting current is limited as a result of determining (e.g., measuring) a voltage of the arc exceeds a predetermined voltage value. For example, the predetermined threshold voltage value can be about 120 Volts (V) to about 140 V (e.g., about 132 V).

In some embodiments, the method can also include displaying an identifier associated with the at least one consumable identified. For example, the identifier can be displayed on a display device (e.g., an indicator light or a monitor screen) 120 in communication with the plasma cutting system.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A method for operating a plasma cutting system, the method comprising:
   initiating, in pilot arc mode, an arc between a set of consumable components disposed in a torch of the plasma cutting system, the set of consumable components including a first consumable component and a second consumable component;
   detecting an operational characteristic of the arc in the pilot arc mode;
   analyzing the operational characteristic to identify at least one consumable component of the set of consumable components; and
   configuring, upon initiation, at least one operating parameter for the plasma cutting system based on the identified consumable component to operate the plasma cutting system in a cutting mode with the identified consumable component.

2. The method of claim 1, wherein the configuring at least one operating parameter includes limiting a cutting current of the plasma cutting system to a predetermined value.

3. The method of claim 2, wherein the predetermined value is about 20 Amps.

4. The method of claim 2, wherein the limiting the cutting current is in response to measuring a voltage value of the arc as being greater than about 132 Volts.

5. The method of claim 1, wherein the arc is a pilot arc.

6. The method of claim 1, wherein the operational characteristic includes a voltage of the arc.

7. The method of claim 1, wherein the set of consumable components includes at least one of a nozzle or an electrode.

8. The method of claim 1, wherein the identifying the at least one consumable component includes comparing a measured voltage of the arc to a threshold value.

9. The method of claim 8, further comprising adjusting an operating parameter of the plasma cutting system based on whether the measured voltage is greater than or less than the threshold value.

10. The method of claim 1, wherein the initiating of the arc is responsive to at least one of generating a torch start signal or activating a trigger device disposed on the torch body.

11. The method of claim 1 further comprising displaying an identifier associated with the at least one consumable identified.

12. The method of claim 1, further comprising determining a voltage of electricity being supplied to the plasma cutting system.

13. The method of claim 12, wherein the configuring at least one parameter comprises, responsive to determining that the voltage of electricity being supplied is below a threshold value, limiting cutting current to the torch to reduce likelihood of system damage while permitting continued use of the torch.

14. A plasma cutting system comprising:
   a torch including:
      a torch body, and
      a set of consumable components connected to the torch body and configured to generate a plasma arc; and
   a power supply operably connected to the torch, the power supply including a controller configured to monitor an arc initiated, in pilot arc mode, between two consumable components of the set of consumable components, the controllers comparing a characteristic of the arc, in the pilot arc mode, to a predetermined set of characteristics; ii) identifying at least one consumable component in the set of consumable components based on the characteristic of the arc, in the pilot arc mode, compared to the predetermined set of characteristics; and iii) configuring, upon initiation, at least one operating parameter for the plasma cutting system based on the identified consumable component to operate the plasma cutting system in a cutting mode with the identified consumable component.

15. The plasma cutting system of claim 14, wherein the arc is a pilot arc.

16. The plasma cutting system of claim 14, wherein the set of consumable components include at least one of a nozzle or an electrode.

17. The plasma cutting system of claim 14, further comprising a display device in communication with the power supply, the display device being configured to output a visual indicator associated with the identified consumable components.

18. A consumable detection system for identifying a consumable component of a set of consumable components connected to a plasma cutting system and configuring the plasma cutting system for a cutting mode, the consumable detection system comprising:

a monitoring module to monitor, during a pilot arc mode, an operational characteristic of an arc generated between at least two consumable components of the set of consumable components disposed within the plasma cutting system; and a control module: i) to analyze the operational characteristic to identify at least one consumable component of the set of consumable components; and ii) based on the operational characteristic, in the pilot arc mode, to configure, upon initiation, at least one operating parameter for the plasma cutting system based on the identified at least one consumable component to operate the plasma cutting system in a cutting mode with the identified consumable component.

19. The consumable detection system of claim 18, wherein the operational characteristic comprises a voltage of the arc.

* * * * *

UNITED STATES PATENT AND TRADEMARK OFFICE
CERTIFICATE OF CORRECTION

PATENT NO. : 9,630,272 B2  Page 1 of 1
APPLICATION NO. : 14/289200
DATED : April 25, 2017
INVENTOR(S) : Gullotta It is certified that error appears in the above-identified patent and that said Letters Patent is hereby corrected as shown below:

In the Claims

Line 10 of Claim 14 (Line 50 of Column 8 in the printed patent), delete "controllers comparing" and replace it with --controller: i) comparing--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*